US009300236B2

(12) United States Patent
Kadric et al.

(10) Patent No.: US 9,300,236 B2
(45) Date of Patent: Mar. 29, 2016

(54) INCREASING THE EXCITATION CURRENT OF A MULTIPHASE AC GENERATOR CONNECTED TO AN ELECTRICAL SYSTEM OF A MOTOR VEHICLE UPON THE ACTIVATION OF THE GENERATOR

(71) Applicant: Bayersiche Motoren Werke Aktiengesellschaft, Munich (DE)

(72) Inventors: Almas Kadric, Munich (DE); Volkmar Witting, Wattens (AT); Christoph Sudan, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/302,193

(22) Filed: Jun. 11, 2014

(65) Prior Publication Data
US 2014/0292285 A1 Oct. 2, 2014

Related U.S. Application Data

(63) Continuation of application No. PCT/EP2012/074788, filed on Dec. 7, 2012.

(30) Foreign Application Priority Data

Dec. 12, 2011 (DE) .................... 10 2011 088 314

(51) Int. Cl.
*H02P 9/00* (2006.01)
*H02P 9/02* (2006.01)
(Continued)

(52) U.S. Cl.
CPC .. *H02P 9/02* (2013.01); *H02P 9/10* (2013.01); *H02P 9/30* (2013.01); *H02P 9/48* (2013.01); *H02P 2101/45* (2015.01)

(58) Field of Classification Search
CPC .............. H02P 9/48; H02P 9/40; H02P 9/10; H02P 9/102; H02P 101/45; F03D 5/02
USPC .......................................... 322/28, 24, 59, 44
See application file for complete search history.

(56) References Cited

U.S. PATENT DOCUMENTS 3,093,789 A * 6/1963 Brohaugh ................... 322/20
3,144,595 A * 8/1964 Graybeal ..................... 318/732
(Continued)

FOREIGN PATENT DOCUMENTS

DE  102 34 088 A1  2/2004
DE  103 61 215 A1  7/2005
(Continued)

OTHER PUBLICATIONS

International Search Report dated Jun. 4, 2013 (Three (3) pages).
(Continued)

*Primary Examiner* — Julio Gonzalez Ramirez
(74) *Attorney, Agent, or Firm* — Crowell & Moring LLP (57) ABSTRACT

A process for increasing the excitation current, particularly when activating the alternator, whose rectified alternator voltage is regulated by way of a regulator, is provided. For regulating the alternator voltage, the regulator sets the excitation current of an excitation winding of the alternator. The regulator further receives a phase signal. A rapid increasing of the excitation current to a defined value takes place, during which the phase signal is analyzed simultaneously. This rapid increasing continues until the phase signal or a quantity derived therefrom meets a defined condition with respect to the alternator voltage. Therefore, a further increasing of the excitation current takes place, preferably at a rate of change reduced with respect to the previous rapid increase.

21 Claims, 5 Drawing Sheets (51) Int. Cl.
*H02P 9/10* (2006.01)
*H02P 9/30* (2006.01)
*H02P 9/48* (2006.01)
*H02P 101/45* (2015.01)

(56) References Cited

U.S. PATENT DOCUMENTS

| | | | |
|---|---|---|---|
| 4,789,817 A | | 12/1988 | Asakura et al. |
| 5,497,071 A | | 3/1996 | Iwatani et al. |
| 5,773,964 A | * | 6/1998 | Peter .............................. 322/20 |
| 6,005,372 A | * | 12/1999 | Kouwa et al. .................... 322/25 |
| 7,944,183 B2 | * | 5/2011 | Nishimura ....................... 322/28 |
| 2007/0008746 A1 | * | 1/2007 | Inukai et al. ............... 363/21.01 |
| 2009/0190280 A1 | * | 7/2009 | Daio et al. ...................... 361/98 |
| 2010/0225284 A1 | | 9/2010 | Aoyama |

FOREIGN PATENT DOCUMENTS

| | | |
|---|---|---|
| DE | 10 2007 033 357 A1 | 1/2009 |
| DE | 10 2010 002 738 A1 | 10/2010 |
| EP | 0 878 890 A1 | 11/1998 |
| EP | 1 386 789 A2 | 2/2004 |
| EP | 1 401 081 A2 | 3/2004 |

OTHER PUBLICATIONS

German Search Report dated Feb. 29, 2012 with Statement of Relevancy (Six (6) pages).
International Rectifier: "IRVR101—Lin Controlled Alternator Voltage Regulator"—Preliminary Data Sheet, www.irf.com, USA, 2003, 15 pages.
Genft, März, STMicroelectronics: "L9911—Car alternator multifunction smart voltage regulator", www.st.com, 2011, 19 pages.

* cited by examiner

INCREASING THE EXCITATION CURRENT OF A MULTIPHASE AC GENERATOR CONNECTED TO AN ELECTRICAL SYSTEM OF A MOTOR VEHICLE UPON THE ACTIVATION OF THE GENERATOR

CROSS REFERENCE TO RELATED APPLICATIONS

This application is a continuation of PCT International Application No. PCT/EP2012/074788, filed Dec. 7, 2012, which claims priority under 35 U.S.C. §119 from German Patent Application No. 10 2011 088 314.2, filed Dec. 12, 2011, the entire disclosures of which are herein expressly incorporated by reference.

BACKGROUND AND SUMMARY OF THE INVENTION

The invention relates to the running-up of the excitation current of a polyphase alternating-current alternator, which is connected to an on-board power supply system of a motor vehicle, when activating the alternator.

For supplying electric consuming devices with electric energy, motor vehicles comprise an electric alternator which is supplied with mechanical energy by way of the drive of the vehicle. The vehicle battery is charged by means of the excess electric power of the alternator.

Generally, a polyphase alternating-current alternator (three-phase current alternator) having three or more phases is used as the alternator. In this case, the polyphase alternating-current alternator is typically implemented as an electric synchronous machine, which comprises a rotor that rotates as a result of the drive and has an excitation winding for generating an excitation magnetic field, and also comprises a stator with a polyphase stator winding. Since the electric consuming devices are typically designed as direct-current consuming devices and the battery is supplied with direct current for the charging, a rectifier is connected on the output side of the polyphase alternating-current alternator and converts the polyphase alternating-current voltage to a direct voltage. In order to keep the rectified alternator voltage constant also at a variable load current and a variable rotational engine speed, an alternator regulator is used which varies the excitation current of the excitation winding, so that a fluctuation of the alternator voltage is leveled.

Figure 1:
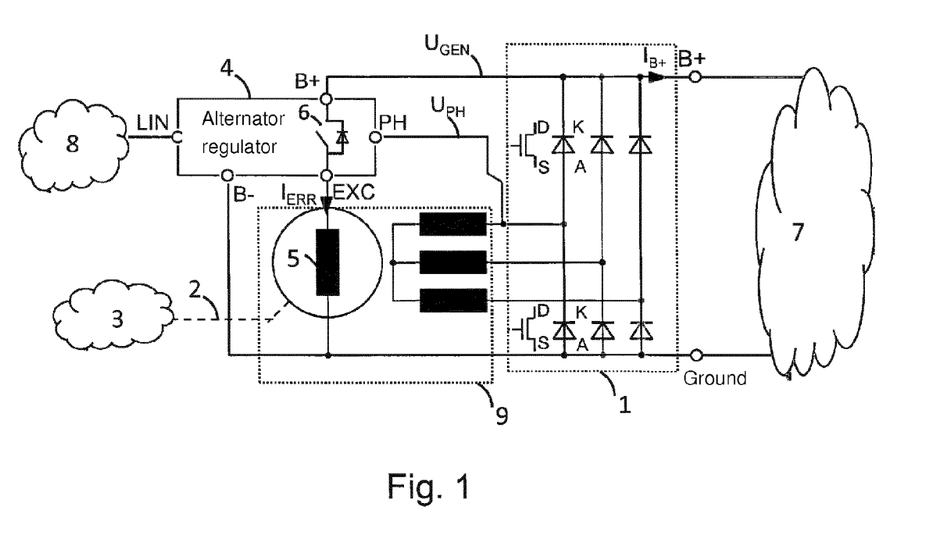
FIG. 1 is a view of a conventional 14 V alternator with a conventional LIN alternator regulator ASIC.

FIG. 1 illustrates an example of a conventional 14 V alternator with a rectifier 1 for a motor vehicle. Here, an example of a 3-phase alternator is shown; however, the alternator may also have, for example, five or six phases. The 14 V alternator converts a portion of the mechanical power of the internal-combustion engine to electric power and thereby guaranties the electric current supply of the on-board vehicle power supply system 7 comprising the battery and the consuming devices. The belt drive 2 transmits the mechanical power of the engine 3, which is determined by the rotational speed and the torque, from the crankshaft to the alternator. The alternator current $I_{B+}$ generated by the alternator is supplied into the on-board power supply system 7 by way of the connection B+ in order to charge the battery and consuming devices, as, for example, the ignition, the headlights or the fan with current. In FIG. 1, the alternator is implemented as a separately excited synchronous machine 9 with an attached regulator 4 and rectifier 1. The rotor of the synchronous machine 9 carries an excitation winding 5 and is supplied with excitation current $I_{ERR}$, for example, by way of two slip rings. The magnetic field of the excitation winding 5 is typically guided by way of pole fingers made of magnetically permeable steel into the stator and induces an alternating voltage during rotation in the stator phases. The voltage amplitude depends on the rotational alternator speed $n_{GEN}$ and the excitation current $I_{ERR}$. The rotational alternator speed $n_{GEN}$ of the alternator is proportional to the rotational speed of the engine. At a given rotational speed of the engine and given alternator voltage $U_{GEN}$, the load moment at the crankshaft rises with the increase of the yielded alternator current $I_{B+}$. The rectifier 1 converts the alternating voltages of the stator phases to the direct voltage $U_{GEN}$ required for the on-board power supply system 7. For the rectifier illustrated in FIG. 1, a bridge circuit is used which has a high-side semiconductor switch connected to the on-board power supply system voltage and a low-side semiconductor switch connected to the ground per phase, so that in each case both semi-oscillations of each phase are used for the rectification. In the case of a 3-phase alternating-current alternator, such a rectifier is also called a six-pulse rectifier. As illustrated in FIG. 1, diodes or, as an alternative, transistors, particularly MOSFETs (metal oxide semiconductor field effect transistors) can be used as semiconductor switches. In the case of the implementation of the rectifier 1, as in FIG. 1, the cathodes K of the high-side diodes are connected to the node B+ of the positive on-board power supply voltage system, and the anodes A of the low-side diodes are connected to the ground node B−. When N-MOSFETs are used as semiconductor switches, the drain connections D of the high-side MOSFETs are connected to the node B+ of the positive on-board power supply system voltage, and the source connections S of the low-side MOSFETs are connected to the ground node B− (see the N-MOSFETs shown next to the diodes). Instead of a alternator illustrated in FIG. 1 with a 3-phase electric machine 9, an alternator with a 5-phase or 6-phase electric machine 9 can be used.

The alternator regulator 4 adapts the excitation current $I_{ERR}$ in order to, also when the load current $I_{B+}$ changes and the rotational engine speed changes, keep the alternator voltage $U_{GEN}$ between B+ and the ground at the desired-voltage specification. The excitation current $I_{ERR}$ is typically varied by the variation of the duty factor of the output stage 6 which supplies the excitation current $I_{ERR}$ of the excitation winding 5. The excitation current $I_{ERR}$ rises with an increasing duty factor and so does the voltage at the alternator output at a constant rotational speed and input power of the load.

The duty factor of the output stage 6 is the duration of the switch-on time, in which the switch of the output stage 6 is switched on, in proportion to a total observation time. At a duty factor of 100%, the switch of the output stage 6 is constantly switched on; at a duty factor of 50%, the switch of the output stage 6 is switched on half the time; and at a duty factor of 0%, the switch of the output stage 6 is constantly switched off. The duty factor of the output stage 6 therefore determines the amplitude of the (mean) excitation current $I_{ERR}$.

In the example of FIG. 1, the alternator regulator 4 has a communication interface for a data bus in the vehicle. For example, in addition to the alternator regulator 4, one or more additional communication users 8, particularly the engine control unit, are connected to the data bus. For example, the regulator 4 receives a desired-voltage specification from the engine control unit by way of the communication interface and reports its own condition to the engine control unit. The communication interface is, for example, a communication interface for the LIN-bus (LIN—Local Interconnect Network). For connecting the alternator regulator 4 to the bus, the connection LIN is provided in FIG. 1.

Nowadays, the regulator 4 is typically implemented in the form of an ASIC (application-specific integrated circuit), i.e. as a monolithically integrated semiconductor circuit. The alternator regulator ASIC 4 (LIN alternator regulator ASIC) communicating by way of the LIB+N bus and illustrated in FIG. 1 has five connections, by means of which it can, for example, acquire the required alternator amplitudes and can communicate with the engine control unit. The functionality visible to the outside and the interfaces of such a LIN alternator regulator ASIC 4 with five connections have been specified in a general form; such LIN alternator regulator ASICs can be obtained from various chip producers. Two examples of such a LIN alternator regulator ASIC 4 with five connections are the TLE8880 by Infineon Co. and the CR665 by Bosch Co.

The connections in FIG. 1 are defined as follows:

B− (Battery minus): Connection to ground, for example, at the engine block by way of the conductive housing of the alternator;

B+ (Battery plus): Connection for the current supply of the regulator 4 and the excitation winding 5 as well as for the voltage metering; the connection to the battery takes place via the cable tree in the vehicle;

LIN: Connection of the LIN-bus interface for the communication, for example, with the engine control unit; by way of the LIN connection, the desired-voltage specification is received and the alternator condition is reported;

EXC: Connection for impressing the excitation current in the excitation winding;

PH: Connection for receiving the phase signal $U_{PH}$, which typically corresponds to a voltage at a phase; the phase signal is used for acquiring the rotational alternator speed by determining the frequency of the phase signal (phase frequency) and for waking up the regulator 4 from the standby mode when a defined alternating-voltage amplitude is detected at the phase connection PH. In FIG. 1, the voltage is tapped directly at the phase; it would also be conceivable that optionally a resistor is situated between the phase and the phase input PH.

In the LIN alternator regulator ASIC 4, the voltage is acquired at the connection B+; the voltage is acquired at the connection B−; the frequency of the phase signal received by way of the connection PH and the excitation current $I_{ERR}$ are acquired and are used for regulating the alternator voltage $U_{GEN}$ between B+ and the ground. In addition, the LIN alternator regulator ASIC 4 has an integrated temperature sensor by means of which the regulator ASIC 4 can be protected from overheating. For regulating the high temperature, the latter reduces the internal desired-voltage specification at high temperatures. A programmable memory area in the regulator ASIC 4 makes it possible to file alternator- or vehicle-specific regulator parameters.

A differentiation can take place particularly between the following operating states of the LIN alternator regulator ASIC 4:

Standby: When the ignition is switched off, the regulator 4 draws as little current as possible in order not to discharge the battery.

Active: The engine control unit communicates with the regulator 4 by way of the LIN bus and the ignition is switched on. If necessary, the regulator 4 can confirm its condition. The excitation current continues to be zero, and the alternator supplies no current.

Pre-excitation: As soon as a defined alternating-voltage amplitude at the phase is detected in the standby mode or a valid desired voltage specification is received by way of LIN, the regulator 4 will change from the standby condition into the pre-excitation. In this case, the excitation current is slowly increased until the frequency at the phase can be reliably recognized. This wake-up operation is possible only when sufficient retentivity is still present in the rotor pole fingers in order to induce a minimal voltage in the phase during rotation.

Regulating: As soon as a valid desired-voltage specification is present and a lower rotational-speed threshold is exceeded (which takes place by analyzing the phase frequency) and therefore the engine is started, the alternator voltage between Pin B+ and the ground will be correspondingly regulated. The duty factor at the excitation current output stage 6 is used as the control variable. The excitation current $I_{ERR}$ will rise as the duty factor increases, and so will the voltage at the alternator output at a constant rotational speed and input power. In order to not abruptly act upon the internal-combustion engine by means of a load moment during idling, the regulating dynamics can be limited by way of a corresponding signal by way of the LIN bus, which activates a so-called load response function. When the load response function is active, for example, up to a defined rotational speed limit, the rate of change of the duty factor of the excitation current output stage is specified; for example, a time period of 3 s is required for an increase from 0% to 100%. The value of the rate of change of the duty factor and the rotational speed limit can typically be specified. For example, a load response value LR=3s is specified, which indicates that the increase from 0% to 100% takes a period of 3 seconds.

The LIN regulator ASIC 4 with five connections illustrated in FIG. 1 was reduced to the necessary interfaces. Because of the high-expenditure internal connection system in the alternator, any additional interface would result in additional expenses.

After the activation of the alternator, for example, at the start of the internal-combustion engine or after the additional start of the alternator during the drive, the alternator will typically start supplying current into the on-board power supply system 7 only after an idle time in the range of one or more seconds after the point in time at which the activation of the alternator was triggered, for example, by way of the engine control unit. It is, in addition conceivable that, after strong load fluctuations, particularly after an abrupt load reduction in the on-board power supply system, as a result of the regulating, the excitation current is reduced to zero or to a low value, and the alternator will then supply current again only after an idle time.

This is caused by the so-called load response function. The load response function limits the rate of change of the excitation current $I_{ERR}$ in that, for example, the rate of change of the duty factor is limited. As a result, the change of the loading of the drive train connected with the increase of the excitation current $I_{ERR}$ is extended with respect to the time over a longer time period by the additional alternator torque so that the engine control unit, particularly, during idling, has sufficient time to compensate the alternator torque. The load response function is typically used during the activating of the alternator, for example, after the engine start at a low rotational engine speed, as well as at a low rotational engine speed during the drive when an additional consuming device is connected.

The above-described idle time, thus the time period between the triggering of the activation of the alternator (for example, by a prompting signal on the part of the engine control unit) and the point in time at which the alternator starts to supply current to the on-board power supply system, occurs during the activating of the alternator. This occurs because the load response function in the alternator regulator 4 slowly increases the excitation current $I_{ERR}$, but typically the voltages at the phases of the alternator will reach the on-board power supply voltage first only in the range of 30 to 40% of the endeavored excitation current nominal value, and only then will the current delivery of the alternator to the on-board power supply system begin. The load response function will carry out its actual task only with the start of the current delivery and, by limiting the rate of change of the excitation current, restricts the rate of change of the alternating current and of the alternator torque, so that the alternator will not abruptly act upon the internal-combustion engine by means of additional torque but in a slowly increasing manner, whereby the idling regulator of the engine will have sufficient time to compensate for the increase of the alternator torque.

The duration of the idle time is a function of the temperature, the rotational engine speed and the current on-board power supply system voltage, which in turn depends on the battery charging state and the onboard power supply system load, and is therefore hard to calculate. Particularly in the case of frequent starting operations of the engine when an automatic engine start-stop system is used, a large number of these idle periods are added up, during which the alternator can unnecessarily supply no current, whereby the charging balance is impaired.

Figure 2:
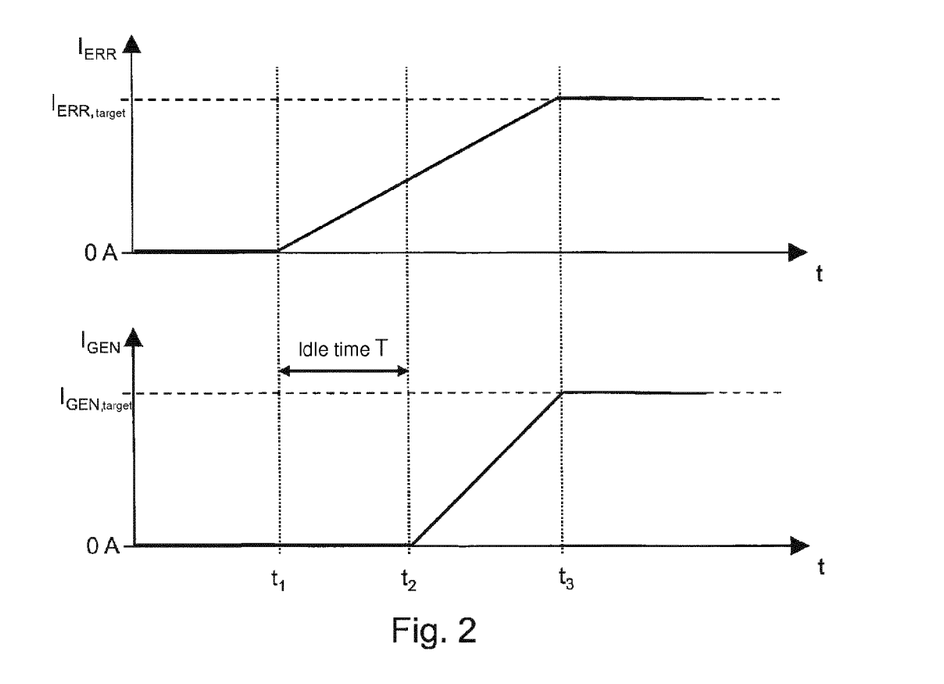
FIG. 2 is a view of the course of the alternator current $I_{GEN}$ and of the excitation current $I_{ERR}$ when activating the alternator in the case of a conventional LIN alternator regulator ASIC with an activated load response function.

The occurrence of the idle time T during the activating of the alternator will be explained as an example by means of FIG. 2, in which case the lower diagram represents an example of a course of the alternator current $I_{GEN}$ and the upper diagram represents an example of the course of the excitation current $I_{ERR}$. At the point in time $t_1$, the activation of the alternator is prompted, for example, on the part of the engine control unit (for example, by sending a desired-voltage specification greater than 10.6 V by way of the LIN bus. The alternator regulator 4 starts to increase the excitation current $I_{ERR}$ at a limited rate of change since, because of the load response function, the rate of change of the duty factor is limited (the time period between $t_1$ and $t_3$ corresponds to the load response value LR, which can be set via LIN). Only at the point of time $t_2$, at which the excitation current value $I_{ERR,nenn}$ is, for example, at 30-40% of the excitation nominal current value $I_{ERR,nenn}$ and the voltages of the phases of the alternator become greater than the alternator voltage, so that the semiconductor switches of the rectifier are intermittently closed, will the current delivery of the alternator start and the alternator current $I_{GEN}$ will slowly rise. The idle time T corresponds to the time period between the point in time $t_1$ and the point in time $t_2$. The nominal excitation current is the excitation current which occurs when the switch of the output stage is continuously switched on, in which case the current is essentially only still limited by the internal resistance of the exciting coil 5. The target value $I_{ERR,ziel}$ illustrated in FIG. 2 corresponds maximally to the nominal excitation current $I_{ERR,nenn}$.

It is an object of the invention to indicate a process for increasing the excitation current, particularly for running up the excitation current when activating the alternator, and a regulator with a corresponding function, the process or the function having a brief idle time until current is delivered into the on-board power supply system.

The object is achieved by the characteristics of the independent claims. Advantageous embodiments are described in the dependent claims.

A first aspect of the invention relates to a process of increasing the excitation current, particularly for running up the excitation current when activating the alternator, whose rectified alternator voltage is regulated by way of a regulator. For regulating the alternator current, the regulator sets the excitation current of an excitation winding of the alternator. Furthermore, the regulator receives a phase signal; this typically indicates the voltage at a phase. In the case of the process, a rapid increase of the excitation current to a certain value takes place in a first step, the phase signal being analyzed simultaneously. This first step lasts until the phase signal or a quantity derived therefrom has met a certain condition, the condition being related to the existing alternating voltage, for example, whether the phase signal or the quantity derived therefrom has reached or exceeded the present alternator voltage or, for example, whether the phase signal or the quantity derived therefrom has reached the present alternator voltage plus a positive or negative offset. For this purpose, the phase signal or the quantity derived therefrom is compared, for example, with the currently present alternator voltage. The excitation current preferably continuously increases until the condition has been met. However, the rate of change of the excitation current may decrease during the first step. In a second step, a further increase of the excitation current takes place, preferably at a rate of change of the excitation current that is reduced in comparison to the previous rapid increase. During the further increase of the excitation current, the rate of change is preferably reduced at least with respect to the range of change at the beginning of the rapid increase. This further increasing during the second step takes place, for example, at a rate of change as in the case of a conventional load response function.

Since, during the rapid increase of the excitation current, the influence on the phase signal is analyzed, the excitation current can be increased within a very short time in a controlled manner to a certain point by analyzing the phase signal. At that point, the alternator loads the drive only by a slight or no additional torque caused by the generating of current. For example, by analyzing the phase signal, the start of the delivery of alternator current into the on-board power supply system can approximately be determined in that the phase signal is compared with the alternator voltage. The excitation current can be rapidly increased until this point in time, because, only with the current delivery into the on-board power supply system, the alternator loads the engine with an additional torque caused by the generating of current (without any generating of current, the alternator loads the engine with a low basic torque as a result of friction losses). After the triggering of the activation of the alternator (for example, by specifying a certain desired voltage), despite the activated load response function, the excitation current can be regulated very rapidly, for example to the value at which the current delivery starts. Subsequently, the load response function, in a known manner, provides a further increase of the excitation current with a reduced rate of change and thereby a continuous alternator current or torque rise without any loading of the idling control of the internal-combustion engine by a greater interference torque caused by the alternator.

The alternator behavior becomes more reproducible for a vehicle system comprising the engine, the idling regulator and the on-board power supply system because, despite the activated load response function, the current delivery starts in the ideal case almost immediately after the prompting of the alternator. The delivered energy of the alternator can be increased in this manner by way of a driving cycle with frequent engine starts as well as the availability of sufficient electric power immediately after the engine start. The function for the rapid running-up of the excitation current can be taken over completely by the alternator regulator, so that, in this case, no additional costs are caused for the overall alternator system in addition to possible additional costs for the alternator regulator expanded by this function. By using a typically already present phase signal, basically no additional connection pin has to be provided at the alternator regulator ASIC for implementing the function.

In the case of the process, the phase signal can be checked directly with respect to meeting the condition. As an alternative, a quantity that is a function thereof, such as the voltage, can be checked by way of the semiconductor switch with respect to meeting a condition. It can, for example, be examined whether the voltage between the anode and cathode of a high-side semiconductor switch, which is calculated, for example, from the phase signal minus the alternator voltage, and/or the voltage between the anode and the cathode of a low-side semiconductor switch, which is calculated, for example, from the chassis ground potential minus the phase signal, reaches a certain threshold value, for example 0 V or 0.2 V.

It is not necessary that, during the first process step, the rate of change of the excitation current remains equally high. For example, the rate of change at the start of the first process step may be very high (in that, for example, the duty factor is set to a maximal value) and can then be reduced during the first process step (in that, for example, the duty factor is reduced to a lower value). It should be assumed anyhow that the rate of speed of the excitation current decreases during the first process step because of the switch-on behavior of a coil (the switch-off behavior is determined by the inductance and the internal resistance of the coil, in which case the internal resistance determines the nominal excitation current).

The process can be used in connection with the activation of the alternator when running up the excitation current from essentially zero or from a low excitation current value or also in situations for increasing the excitation current, in which the alternator has already been active for some time, but the alternator current was reduced, for example because of a load shedding (for example, to zero or a low value) and is now increased again.

The excitation current is preferably increased until a signal value relative to the phase signal—particularly an instantaneous value of the phase signal, a peak-peak value of the phase signal or a maximal value of the phase signal—reaches a defined threshold value. The threshold value may correspond to the alternator value, or the alternator value plus a positive or negative offset.

The current may, for example, be rapidly increased until the phase signal corresponds to the alternator voltage; here, the instantaneous value, the maximal value or the peak-peak value of the phase signal can be compared with the alternator voltage. The reason is that, when the alternating voltage is reached, the current delivery is imminent because then the semiconductor switches are just about to become temporarily conductive. Diodes as semiconductor switches typically become conductive when, between the anode and the cathode, a flux voltage of approximately $U_F \approx 0.6$ V decreases. As a function of the triggering, in the case of N-MOSFETs as semiconductor switches, the voltage between the source and the drain typically remains clearly below 0.6 V. When, for example, the instantaneous value, the maximal value or the peak-peak value of the phase signal reaches a value which corresponds to the alternator voltage plus the flux voltage $U_F$ of the semiconductor switch (approximately 0.6 V in the case of diodes and/or as a function of the triggering, also clearly lower in the case of N-MOSFETs), the alternator voltage plus the flux voltage $U_F$ or the alternator voltage plus $2 \cdot U_F$, the semiconductor switches of the rectifier will be conductive. The rapid increase of the excitation current should therefore preferably be terminated already at lower values for the phase signal, for example, with the reaching of the alternator voltage.

Preferably the condition for the phase signal or for the quantity derived therefrom for terminating the first phase of the rapid increasing of the excitation current is selected such that, when the condition has been met, the delivery of alternating current to the on-board power supply system will approximately begin, the delivery of alternator current to the on-board power supply system is imminent, or a low alternator current is already being delivered to the on-board power supply system. For implementing the second alternative, it can be defined, for example, as a condition for the phase signal, that the voltage of the phase signal reaches the alternator voltage. The third alternative has the advantage that here the time required for the running-up of the current is the shortest, but the abrupt occurrence of at least a small additional torque should be expected.

The regulator is preferably further developed such that for adjusting the excitation current, it sets the duty factor of an output phase for generating the excitation current. For the fast increase of the current, the process can be provided that the duty factor is increased at a high (constant or variable) rate of speed or, as an alternative, that the duty factor is abruptly set to a high value, for example, to a maximal value.

In the case of the first alternative, the duty factor will, for example, be increased until the condition for the phase signal or the quantity derived therefrom has been met. For the subsequent further increasing of the excitation current, in this case, for example, the duty factor will then be further increased, the rate of change of the duty factor, however, being less than previously.

In the case of the second alternative, the high duty factor will, for example, be maintained until the phase signal or a quantity derived therefrom has met the above-mentioned condition. When the excitation current is increased further, the duty factor will then at least initially be lower than the high previously set duty factor.

A second aspect of the invention is aimed at a regulator having a function for running up the excitation current. The regulator preferably is a regulator that is implemented as an ASIC. The regulator is set up for regulating the rectified alternator voltage and, for this purpose, setting the excitation current of an excitation winding of the alternator. The regulator further receives a phase signal. In addition, the regulator is set up for rapidly increasing the excitation current and in the process analyzing the phase signal. Here, the regulator checks whether the phase signal or a quantity derived therefrom meets a defined condition with respect to the alternator voltage, and increases the excitation current until the phase signal or a quantity derived therefrom meets the condition. The regulator is further set up, for then additionally increasing the excitation current, particularly at a rate of speed reduced with respect to the fast increasing.

The regulator preferably is a LIN alternator regulator ASIC with five connections.

The preceding statements concerning the process of the invention according to the first aspect also correspondingly apply to the regulator according to the invention according to the second aspect of the invention. Advantageous embodiments of the regulator according to the invention correspond to the described advantageous embodiments of the process of the invention.

In the following, the invention will be described with the aid of the attached drawings by means of several embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

The 14 V alternator with the conventional LIN alternator regulator ASIC 4 illustrated in FIG. 1 was discussed in the introduction to the specification. In addition, the occurrence of the idle time when activating the alternator was also explained in the introduction to the specification by means of FIG. 2. According to the invention, the regulator 4 illustrated in FIG. 1 is expanded by a function which, while analyzing the phase signal $U_{PH}$ induced as a function of the excitation current $I_{ERR}$, and applied to the Pin PH in the form of a voltage, permits a rapid increase of the excitation current $I_{ERR}$ when activating the alternator. For this purpose, by means of the phase signal $U_{PH}$, for example, the start of the current delivery can be determined, and the excitation current $I_{ERR}$ can very rapidly be regulated to a value at which the current delivery to the on-board power supply system 7 begins or at which the beginning of the current delivery is immediately imminent. A LIN alternator regulator ASIC according to the invention, indicated as an example with the function according to the invention for the rapid running-up of the excitation current may have, for example, all characteristics of the LIN alternator regulator ASIC 4 illustrated in FIG. 1, so that the description of the LIN alternator regulator illustrated in FIG. 1 also applies to the LIN alternator regulator according to the invention with the exception of the differences when running up the excitation current $I_{ERR}$ described in the following.

Figure 3:
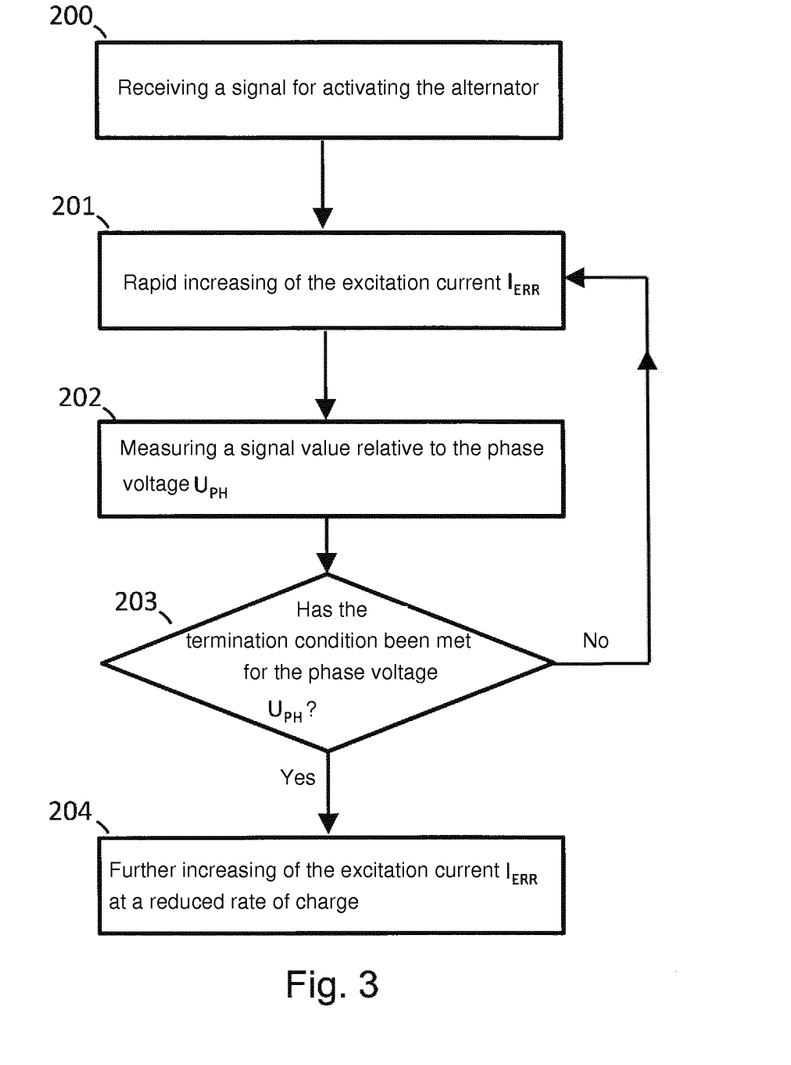
FIG. 3 is a view of an example of a flow chart of the function according to the invention for the rapid running-up of the excitation current $I_{ERR}$.

FIG. 3 illustrates an example of the flow chart of the function according to the invention for the rapid running-up of the excitation current $I_{ERR}$. In Step 200, a signal for activating the alternator is received on the part of the regulator ASIC 4, for example, a desired-voltage specification greater than 10.6 V by way of the LIN bus.

Figure 4:
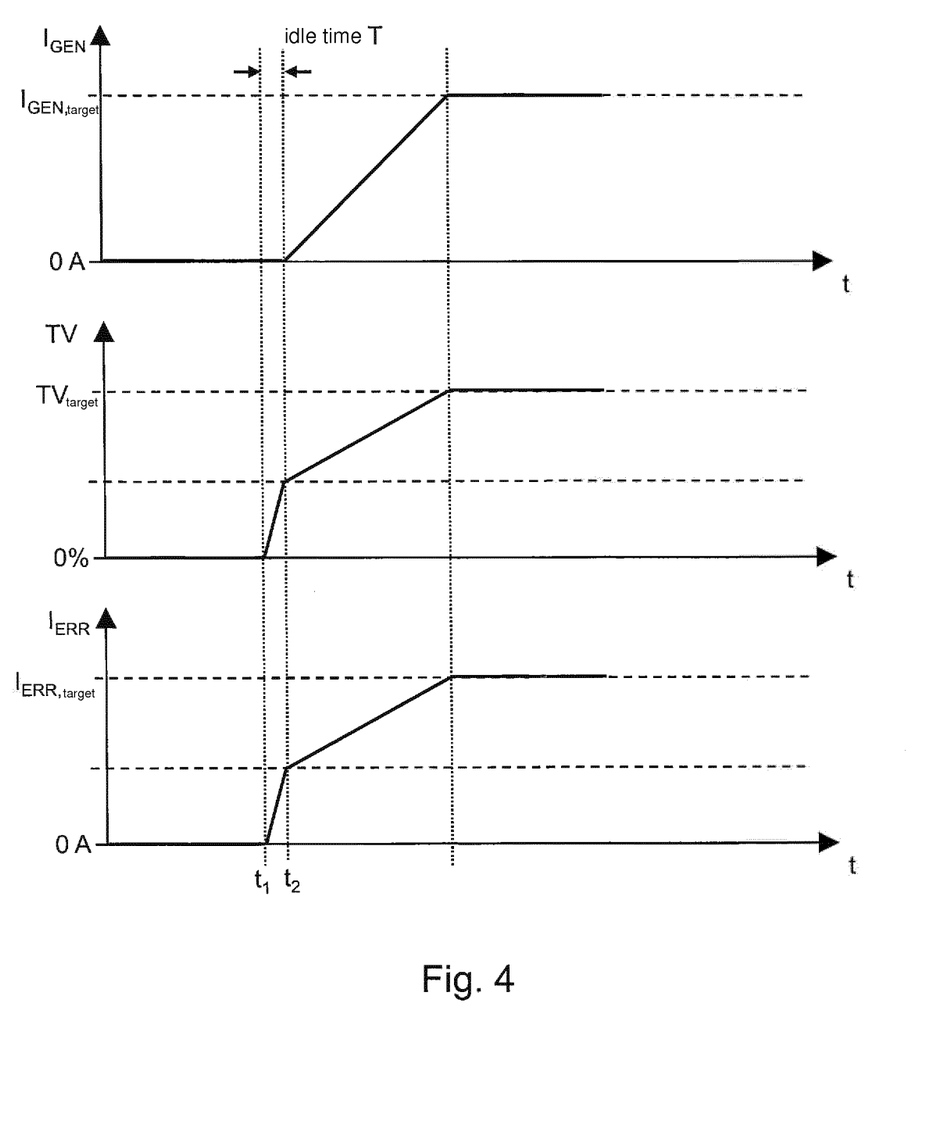
FIG. 4 is a view of an example of the course of the alternator current $I_{GEN}$, of the duty factor TV of the excitation current output stage and of the excitation current $I_{ERR}$ when activating the alternator in a first embodiment of the function according to the invention.
Figure 5:
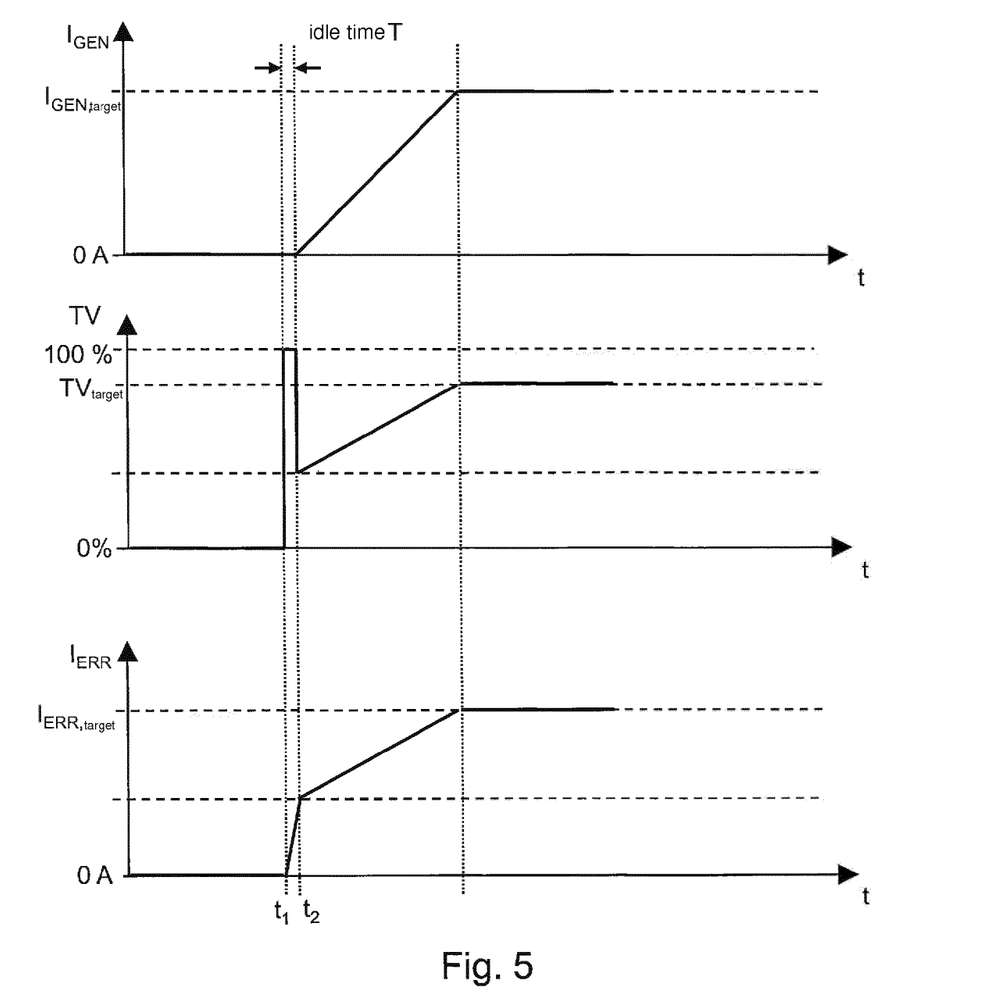
FIG. 5 is a view of an example of the course of the alternator current $I_{GEN}$, of the duty factor TV of the excitation current output stage and of the excitation current $I_{ERR}$ when activating the alternator in a second embodiment of the function according to the invention.

Then, in Step 201, the excitation current $I_{ERR}$ is increased rapidly. FIGS. 4 and 5 illustrate two examples of possibilities for this purpose. As illustrated in the center diagram in FIG. 4, immediately after the receiving of the prompt signal, the duty factor TV of the triggering of the output stage 6, which generates the excitation current $I_{ERR}$, is increased at a high rate of change, for example, at a rate of change which corresponds to an increase of the duty factor from 0% to 100% in less than is, for example, 100 ms. In this case, the excitation current $I_{ERR}$ increases at a high rate of change similarly to the duty factor TV, for example, at a rate of change of $I_{ERR.nenn}/100$ ms (theoretically, this high rate of change would be possible to approximately 80% of $I_{ERR.nenn}$. This is illustrated in a simplified manner in the bottom diagram in FIG. 4. During the rapid increase, the excitation current must not necessarily be increased starting from 0%. For example, because of the triggering of the output stage during the pre-excitation, a low value may already be present for the duty factor; the same applies to FIG. 5. The rapid increase of the duty factor TV in FIG. 4 may, for example, be generated by way of a specific ramp function for the duty factor at a high rate of change or by way of a correspondingly fast PI regulator, which will be active until the termination condition has been met in Step 203.

In the case of the alternative in FIG. 5, bottom, after the receiving of the signal for activating the alternator at the point in time $t_1$, a high value is abruptly set for the duty factor TV, for example, a duty factor of 100%. The excitation current $I_{ERR}$ thereby increases at still higher rate of change than in FIG. 4. This will result in a very rapid increase of the excitation current $I_{ERR}$ to close to the 0A threshold of the alternator current $I_{GEN}$.

After a certain change of the excitation current $I_{ERR}$, a signal value is measured which relates to the phase signal $U_{PH}$ (see Step 202 in FIG. 3), for example, a signal value obtained by further processing the phase signal $U_{PH}$ (like a peak-peak value or a maximal value for the phase voltage) or an instantaneous value of the phase signal.

Figure 6:
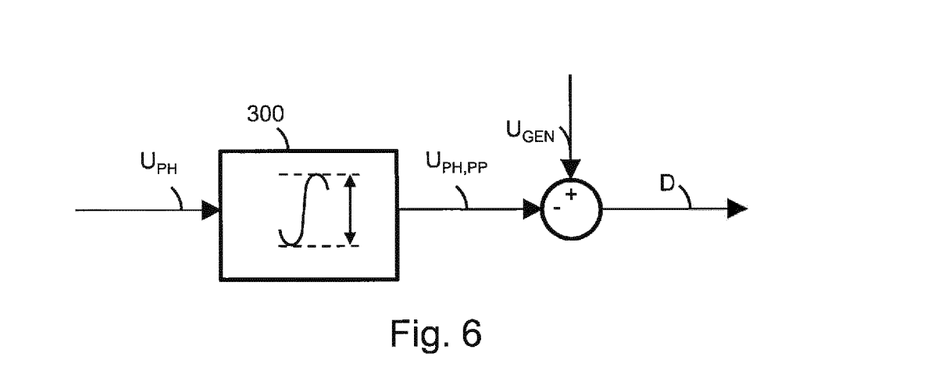
FIG. 6 is a view of an example of an implementation for analyzing the phase signal $U_{PH}$.

In Step 203, it is checked whether a termination condition for the rapid increasing of excitation current $I_{ERR}$ has been met (or in other words, whether a condition for the continuation of the rapid increasing of the excitation current $I_{ERR}$ has been met). For example, it is checked whether the signal value relative to the phase signal (for example, the peak-peak value of the phase signal) has reached the alternator voltage or the alternator voltage plus a positive or negative offset. In FIG. 6, an example of the implementation is illustrated in a simplified manner, in which the phase signal value $U_{PH}$ of the Pin PH with respect to the ground (Pin B−) is analyzed by means of a peak-peak detector 300, which determines the peak-peak value $U_{PH,PP}$ of the phase signal $U_{PH}$ by way of a defined time window. The peak-peak detector 300 determines, for example, the amplitude between a maximal value and a minimal value of the phase signal $U_{PH}$ within a time window. The time window should preferably be greater than the period of the phase signal, but not too large. The peak-peak value $U_{PH,PP}$ of the phase signal $U_{PH}$ will then be compared with the value of the alternator voltage $U_{GEN}$ received by way of the pins B+ and B− (or with a value that is by an offset higher or lower than the alternator voltage), in which case, for example, a differential value D is determined in the following form:

$$D = U_{GEN} - U_{PH,PP}.$$

As a termination condition for the rapid increasing of the excitation current $I_{ERR}$, it may, for example, be checked whether the peak-peak value $U_{PH,PP}$ has reached or exceeded the alternator voltage $U_{GEN}$, i.e., whether D corresponds to the zero value or a negative value.

The rapid running-up of the excitation current therefore takes place by means of a closed loop. During the rapid running-up, the phase signal $U_{PH}$ is analyzed, and the presence of the condition is checked, for example, by comparing the peak-peak value $U_{PH,PP}$ with the alternator voltage and, in the event of an absence of the termination condition, the excitation current is further rapidly increased, whereby the phase signal $U_{PH}$ continues to increase.

The use of a peak-peak detector 300 may also be dispensed with, and only the instantaneous phase signal $U_{PH}$ may be compared with the alternator voltage $U_{GEN}$ between B+ and B− and it may be checked when the phase signal reaches or exceeds the alternator voltage $U_{GEN}$, i.e., whether D corresponds to the zero value or to a negative value. So that, when the excitation current $I_{ERR}$ increases, the phase signal $U_{PH}$ starts from the chassis ground $U_{B-}$ (=0 V), the pin PH should preferably be connected with the chassis ground $U_{B-}$ by way of a high ohmic resistance (either on the ASIC or externally).

As long as the termination condition in Step 203 in FIG. 3 has not been met, the excitation current $I_{ERR}$ will continue to be rapidly increased (see Step 201). In contrast, when the termination condition has been met, there will be no further rapid increasing of the excitation current $I_{ERR}$. Instead, the excitation current $I_{ERR}$ will be increased at a rate of change reduced in comparison to the previously described target value $I_{ERR,ziel}$ for the excitation current $I_{ERR}$, for example, to the nominal excitation current value $I_{ERR,nenn}$ (see Step 204). In this case, the excitation current $I_{ERR}$ is increased correspondingly slowly, for example, by using the load response function.

In the case of the example in FIG. 4, the termination condition is met immediately before the point in time $t_2$ at which the current delivery to the on-board power supply system starts, and the duty factor TV will then be increased at a reduced rate of change. Also the rate of speed of the excitation current $I_{ERR}$ is reduced in comparison to previously.

In the case of the example in FIG. 5, the termination condition is met immediately before the point in time $t_2$ at which the current delivery to the on-board power supply system starts, and the previously constant and high duty factor TV is reduced to a lower value and from there is increased at a low rate of change. The resulting course of the excitation current $I_{ERR}$ is similar to that in FIG. 4.

Figure 7:
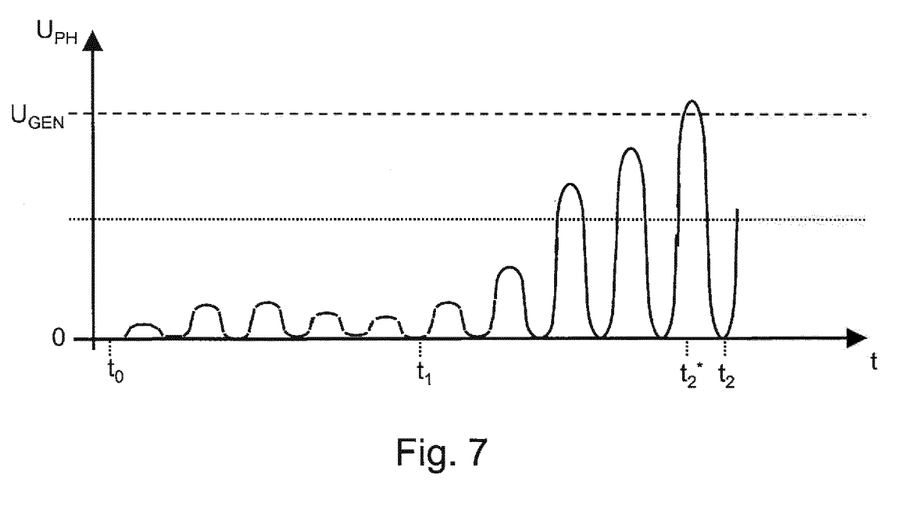
FIG. 7 is a view of an example of the course of the phase signal $U_{PH}$ when activating the alternator.

FIG. 7 illustrates an example of the course of the phase signal $U_{PH}$ over the time t. In the example in FIG. 7, the phase signal $U_{PH}$ is situated without excitation on $U_{B-}$, because the pin PH is guided by way of a high ohmic resistance to $U_{B-}$. At the point in time $t_0$, the prompting of the alternator takes place, and the regulator triggers a pre-excitation in that the output stage 6 is briefly switched on, so that a low excitation current $I_{ERR}$ is impressed, which continues to flow by way of the free-running diode in the output stage, and results in an induction of a low phase signal $U_{PH}$. The excitation current $I_{ERR}$ and the phase signal $U_{PH}$ will then slightly decay again. At the point in time $t_1$, the regulator begins to rapidly run up the excitation current $I_{ERR}$, so that the induced phase signal $U_{PH}$ increases (the regulator needs the time from $t_0$ to $t_1$ in order to accurately recognize the rotational speed; for example, approximately 40 ms are required for this purpose). Since the phase signal $U_{PH}$ is even lower than the alternator voltage $U_{GEN}$, and the semiconductor switches of the rectifier are switched off, no alternator current will flow.

At the point in time $t_2^*$, the termination condition is met for the termination of the rapid running-up; for example, because, at the pointing time $t_2^*$, the instantaneous value of the phase signal $U_{PH}$ approximately reaches the alternator voltage $U_{GEN}$ (optionally plus a certain offset), or the peak-peak value $U_{PH,SS}$ of the phase signal $U_{PH}$ reaches the alternator voltage $U_{GEN}$ (optionally plus a certain offset). At the point in time $t_2^*$, the excitation current $I_{ERR}$ is, for example, in the range of 30-40% of the nominal excitation current $I_{ERR,nenn}$. Subsequently, a further increase of the excitation current $I_{ERR}$ takes place at a reduced rate of speed. At the point of time $t_2$, which is just after the point of time $t_2^*$, the alternator will start to supply current. Depending on the selection of the termination condition, the point of time $t_2$ may also correspond to the point of time $t_2^*$ or be situated just before the point of time $t_2^*$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for increasing an excitation current of a polyphase alternating-current alternator connected to an on-board power supply system of a motor vehicle, wherein a regulator is connected to the alternator and a rectifier is connected to an output side of the alternator, and wherein the regulator is configured to receive a phase signal, the method comprising the acts of:
   generating, by the rectifier, a rectified alternator voltage that is regulated by way of the regulator;
   increasing, by the regulator, the excitation current of an excitation winding of the alternator at an initial rate of change, wherein the excitation current is based on a duty factor of an output stage of the regulator;
   determining, by the regulator during said increasing of the excitation current, whether at least one of the phase signal and a quantity derived from the phase signal satisfies a condition relating to a present rectified alternator voltage; and
   continuing, after the at least one of the phase signal and the quantity derived from the phase signal satisfies the condition, to increase the excitation current to a target value at a rate reduced with respect to the initial rate of change.

2. The method according to claim 1, wherein the initial rate of change of the excitation current corresponds to an increase of the duty factor from 0% to 100% in less than 1 second.

3. The method according to claim 2, wherein the increase of the duty factor from 0% to 100% in less than 1 second occurs over a constant or variable rate of speed.

4. The method according to claim 2, wherein the increase of the duty factor from 0% to 100% in less than 1 second occurs abruptly.

5. The method according to claim 1, wherein increasing the excitation current comprises increasing the excitation current at the initial rate of change until a signal value relative to the phase signal has at least reached a defined threshold that corresponds to one of (i) the rectified alternator voltage, and (ii) the rectified alternator voltage plus a positive or negative offset, wherein the signal value is one of an instantaneous value of the phase signal, a peak-peak value of the phase signal and a maximal value of the phase signal.

6. The method according to claim 2, wherein increasing the excitation current comprises increasing the excitation current at the initial rate of change until a signal value relative to the phase signal has at least reached a defined threshold that corresponds to one of (i) the rectified alternator voltage, and (ii) the rectified alternator voltage plus a positive or negative offset, wherein the signal value is one of an instantaneous value of the phase signal, a peak-peak value of the phase signal and a maximal value of the phase signal.

7. The method according to claim 1, wherein, upon the condition being satisfied, the method further comprises starting a delivery of an alternator current to the on-board power supply system.

8. The method according to claim 2, wherein, upon the condition being satisfied, the method further comprises starting a delivery of an alternator current to the on-board power supply system.

9. The method according to claim 5, wherein, upon the condition being satisfied, the method further comprises starting a delivery of an alternator current to the on-board power supply system.

10. The method according to claim 1, wherein, upon the condition being satisfied, a low alternator current is already being delivered to the on-board power supply system.

11. The method according to claim 1, wherein
increasing the excitation current at the initial rate of change comprises setting, by the regulator, an initial rate of increase for the duty factor which corresponds to a duty factor increase from 0% to 100% in less than 1 second, and
continuing to increase of the excitation current comprises setting, by the regulator, a rate of increase for the duty factor which is reduced with respect to said initial rate of increase for the duty factor.

12. The method according to claim 1, wherein
increasing the excitation current further comprises setting, by the regulator, a first duty factor at a maximal duty factor, wherein the first duty factor is maintained until the at least one of the phase signal and the quantity derived from the phase signals satisfies the condition,
continuing to increase of the excitation current comprises setting, by the regulator, a rate of increase for the duty factor which is reduced with respect to said first duty factor.

13. The method according to claim 12, wherein the first duty factor corresponds to a duty factor change from 0% to 100% in less than 1 second.

14. The method according to claim 1, wherein said increasing of the excitation current comprises increasing the excitation current to between 20% and 50% of the excitation nominal current value before the condition is satisfied.

15. The method according to claim 14, wherein said increasing of the excitation current comprises increasing the excitation current to between 30% and 40% of the excitation nominal current value before the condition is satisfied.

16. The method according to claim 1, wherein increasing the excitation comprises increasing the excitation current during an activating of the alternator.

17. The method according to claim 1, wherein increasing the excitation current comprises one of increasing the duty factor at a constant or variable rate of speed, and abruptly setting the duty factor to a high value.

18. The method according to claim 1, wherein the target value corresponds to a nominal excitation current.

19. A regulator configured to increase an excitation current of a polyphase alternating-current alternator connected to an on-board power supply system of a motor vehicle, wherein a rectifier is connected on an output side of the alternator and wherein the rectifier is configured to generate a rectified alternator voltage, wherein the regulator is configured to:
regulate the rectified alternator voltage,
receive a phase signal,
increase the excitation current of an excitation winding of the alternator at an initial rate of change, wherein the excitation current is based on a duty factor of an output stage of the regulator,
determine, during said increasing of the excitation current, whether at least one of the phase signal and a quantity derived from the phase signal satisfies a condition relating to a present rectified alternator voltage, and
continue, after the at least one of the phase signal and the quantity derived from the phase signal satisfies the condition, to increase the excitation current to a target value at a rate that is reduced with respect to the initial rate of change.

20. The regulator according to claim 19, wherein the regulator is implemented as an application-specific integrated circuit having only the following five connections:
a ground connection,
a current supply connection,
a connection of a Local Interconnect Network-bus interface,
a connection configured to impress the excitation current into the excitation winding, and
a connection configured to receive the phase signal.

21. The regulator according to claim 19, wherein the target value corresponds to a nominal excitation current.

* * * * *